United States Patent [19]

Clark, III

[11] 4,179,822

[45] Dec. 25, 1979

[54] TESTING APPARATUS AND METHOD

[76] Inventor: Stephen C. Clark, III, 3900 16th St., NW., Washington, D.C. 20011

[21] Appl. No.: 536,257

[22] Filed: Dec. 24, 1974

[51] Int. Cl.² ............................................. G09B 7/06
[52] U.S. Cl. ..................................... 35/9 B; 35/48 R
[58] Field of Search .................... 35/6, 8 R, 8 A, 9 R, 35/9 A, 48 R, 9 B

[56] References Cited

U.S. PATENT DOCUMENTS

| | | | |
|---|---|---|---|
| 3,141,243 | 7/1964 | Chapman et al. | 35/9 A X |
| 3,371,321 | 2/1968 | Adams | 35/8 R X |
| 3,416,242 | 12/1968 | Nisbet | 35/48 R |
| 3,491,464 | 1/1970 | Gray | 35/48 R |
| 3,500,559 | 3/1970 | Jones et al. | 35/48 R |
| 3,528,181 | 9/1970 | Arbon et al. | 35/9 A |
| 3,538,626 | 11/1970 | Frank | 35/48 R |
| 3,541,700 | 11/1970 | Montgomery | 35/9 A |
| 3,718,986 | 3/1973 | Hewitt | 35/9 A |
| 3,748,754 | 7/1973 | LaBerge | 35/48 R |

*Primary Examiner*—Vance Y. Hum
*Attorney, Agent, or Firm*—Burns, Doane, Swecker & Mathis

[57] ABSTRACT

The console adapted to be interconnected to a computer for administering a test in which the questions have plural answers. After selecting a number of answers equal to the number of correct answers to a question, the student is informed of the number of incorrect answers and afforded an opportunity to complete the answer. This process is repeated until all of the correct answers have been identified and the number of errors in identifying the correct answers is utilized to indicate the student's score. A display of the rate of progression through the test is updated after each question is answered. A method of administering the test of plural answer questions as well as methods of scoring the test are also disclosed.

13 Claims, 7 Drawing Figures

TESTING APPARATUS AND METHOD

BACKGROUND OF THE INVENTION

The present invention relates to testing methods and apparatus and more specifically to methods and apparatus for testing a student's knowledge by the use of a number of plural answer questions.

To facilitate the administration of tests by reducing the time required to effect the scoring thereof, it has become increasingly popular to provide multiple-choice questions. Such multiple-choice tests may be rapidly scored manually through the use of overlays, and computer systems are becoming increasingly popular for electronically scoring the tests. Multiple-choice tests have a major disadvantage in that the correct answer may often be selected by chance and there are no degrees of correctness.

It is accordingly an object of the present invention to obviate the disadvantages of multiple-choice questions and to provide a novel method and apparatus for testing a student's knowledge.

It is another object of the present invention to provide a novel method and apparatus for magnifying the degree of error of the student in arriving at the correct response.

It is still another object of the present invention to provide a novel method and apparatus for increasing the student's learning by indicating to him the correctness of the answers as the test progresses.

Still another object of the present invention is to provide a novel method and apparatus in which the rate of progression through the test is indicated to the student and updated on a question-by-question basis.

It is yet another object of the present invention to provide a novel method and testing apparatus in which the student's score is displayed and updated at the end of each question in the test.

These and many other objects and advantages of the present invention will be readily apparent from the claims and from the following description of a preferred embodiment when read in conjunction with the appended drawings.

THE DETAILED DESCRIPTION

Figure 1:
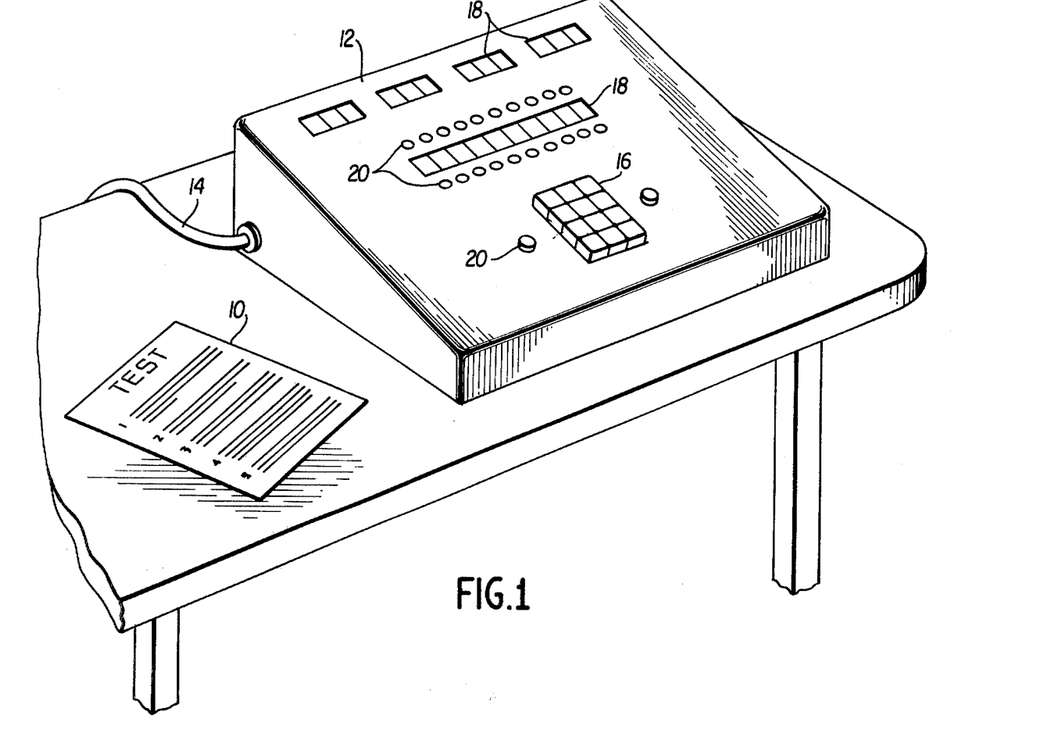
FIG. 1 is a pictorial view of the testing console of the present invention.
Figure 2:
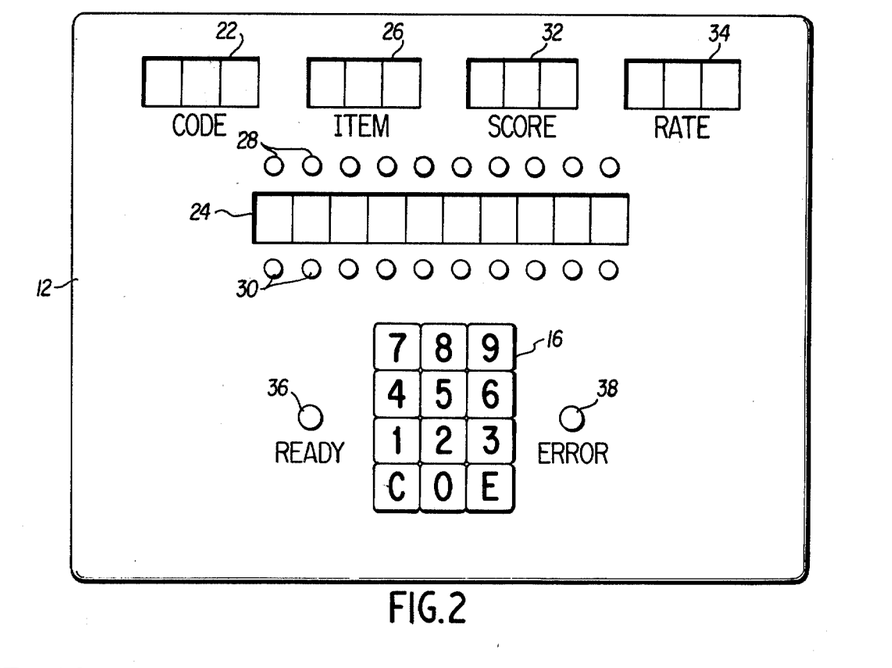
FIG. 2 is a plan view of the testing console.

With reference now to the drawings and with particular reference to FIGS. 1 and 2, a student to be tested may be provided with a printed test 10 and seated at a console 12. The console 12 may be connected by a suitable conventional wiring harness 14 to a special purpose digital computer or suitably programmed general purpose digital computer (not shown in FIGS. 1 and 2). The student communicates with the computer by means of a standard keyboard 16 and the computer responds with the numeric displays 18 and the panel lamps 20.

With reference to FIG. 2, the test is initiated by the action of the student in depressing the code key C and three numeric keys providing instructions to the computer in accordance with the computer program. The student must, of course, be furnished with a code listing for this purpose. The computer responds to the operation of each key by visually displaying to the student the code as keyed in the display 22. If the code requires further entries such as a student identification number, the computer may display these additional numbers on the main display 24. In the event of an error or dissatisfaction by the student with his entry for any reason, the code number may again be entered. When the display is satisfactory to the student, the end of code key E may be operated to effect storage of the displayed data and the blanking of the display for the next entry.

The item display 26 may be automatically provided by the computer or alternatively may be entered by the student by way of an appropriate code. The item display may serve to indicate the test question currently being answered.

It is anticipated that each of the questions in the test will be multiple answers, e.g., five correct answers out of the ten answers printed in the test 10. The student, by operation of the keyboard 16, will then select the five answers believed to be correct and the computer will effect the display thereof in the main display 24. Upon the operation of the key which selects the last of the five answers, the computer will evaluate the selected answers and indicate the correctness thereof by way of a green light 28 associated with each of the individual displays in the main display 24. The incorrectness of the selected answers may be indicated by way of a red light 30 also associated with each of the individual displays in the main display 24.

Assume, by way of example, that the student has correctly selected three of the five correct answers. He will thus be informed of the correctness of the three answers, can review the question, and select the two additional answers believed at that time to be correct. Upon the selection of the second of these answers, the computer will again perform an evaluation and indicate the correctness or incorrectness of these additional responses. Again by way of example, an indication by the computer that one of the answers is still incorrect will require another review of the question and the selection of still another answer by the operation of another key. This process may be repeated until the answer has been correctly identified.

Among the advantages of the testing method of the present invention is the magnification or resolution of the error of the student in arriving at the correct answers. In the typical multiple-choice question, the student correctly selecting three of the five answers would be awarded a 60 percent score. However, under the system of the present invention, the student who thereafter selects the two correct answers may score higher than the student who selects only one, or neither one, of the two additionally correct answers in his first attempt. Depending upon the selection process, a student may have as many as five incorrect answers in arriving at the correct five answers. Resolution is thus possible between the two students who initially select the three of the five correct answers and thereafter select the two correct answers without error and the student who accumulates three additional errors in finally selecting the two additionally correct answers.

Another significant advantage of the present invention is that the student is continually referred back to the question in selecting the answers and receives the information regarding the correctness thereof at a time when he is most receptive. The learning process is thus furthered by the testing of the student's knowledge.

With continued reference to FIG. 2, the score display 32 may be continually updated either in absolute or in relative terms depending upon the testing program so that the student may be continually advised of his performance as the test progresses. In addition, the rate display 34 may be continually updated to provide either in absolute or in relative terms an indication of the student's rate of progression through the test. In this way, the student may be continually advised of the need to accelerate his rate of answering questions and/or of the opportunity to further consider a given question without endangering the completeness of the test.

Of the two remaining indicator lamps illustrated in the console of FIG. 2, the READY lamp 36 indicates that the computer is ready to accept information from the keyboard and should appear to be continuously lighted unless delays are encountered through the use of a time shared computer. The ERROR lamp 38 will indicate to the student that the procedure is incorrect and that the last entry made by the student through the operation of the keyboard 16 is being ignored by the computer. A subsequent entry by operation of the keyboard 16 will permit continuation of the test.

Figure 3:
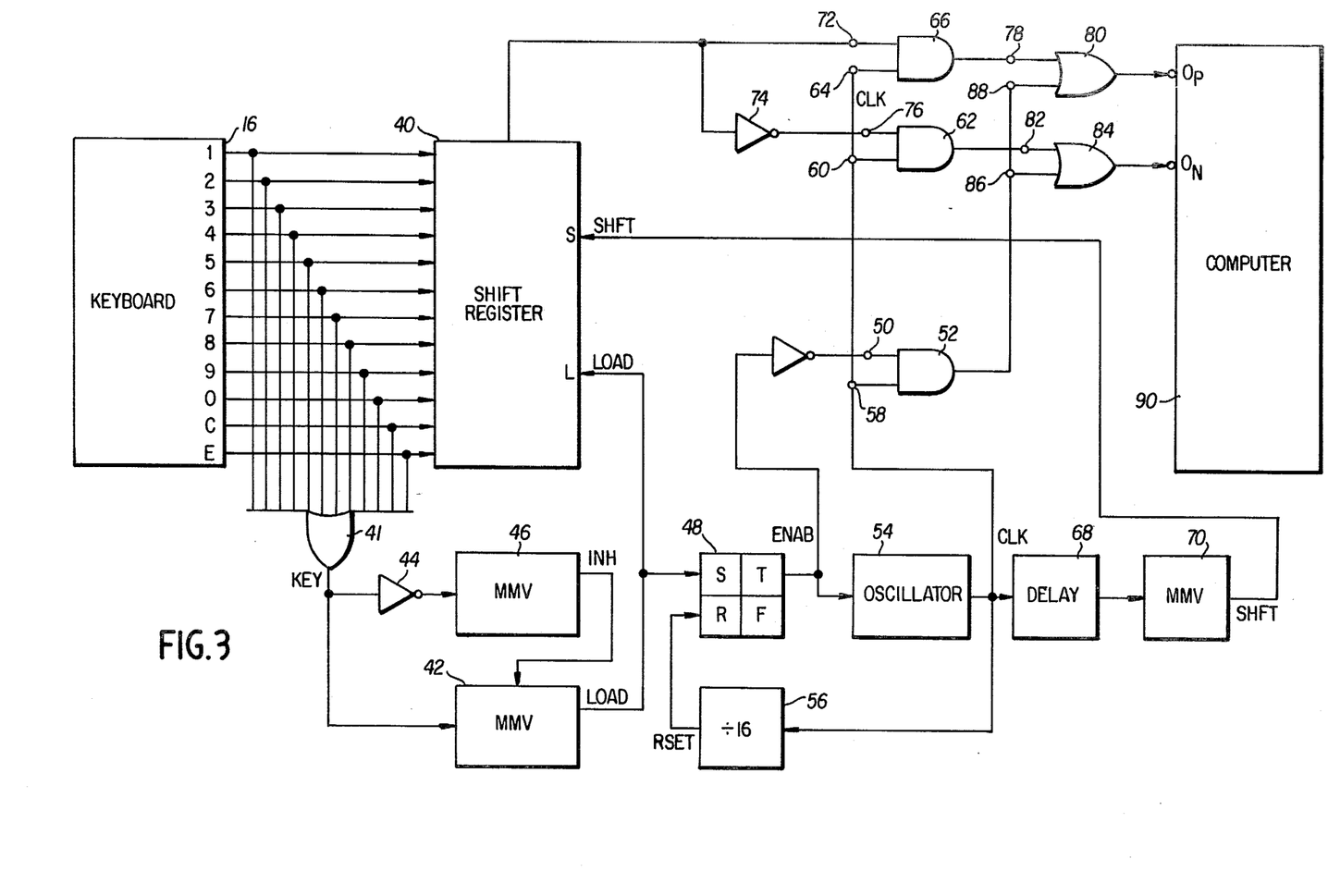
FIG. 3 is a functional block diagram of the transmit circuit of the console illustrated in FIGS. 1 and 2.

With reference now to FIG. 3, the keyboard 16 of the console 12 of FIGS. 1 and 2 may be directly connected to a specified bit position of a parallel in-serial out shift register 40. Each of the keys of the keyboard 16 may additionally be connected to one input terminal of a twelve input OR gate 41 and the output terminal thereof connected to the trigger input terminal of a conventional monostable or one-shot multivibrator 42 so that the operation of any key on the keyboard 16 will trigger the multivibrator 42 to provide a LOAD output signal of 0.5 microseconds duration. This LOAD signal from the multivibrator 42 is applied to the load input terminal of the shift register 40 so that the shift register 40 may accept the input data from the keyboard 16.

The output terminal of the OR gate 41 may also be connected through an inverter 44 to the input terminal of a conventional monostable or one-shot multivibrator 46 to provide at the true output terminal thereof a 1.0 microsecond inhibit or INH signal when the key of the keyboard 16 is released. This INH signal may be applied to the multivibrator 42 to inhibit the response thereof for the duration of the INH signal. In this way, the possibility of key bounce or double entry is eliminated as will be subsequently discussed in connection with FIG. 4.

The LOAD output signal from the multivibrator 42 may also be applied to the set input terminal S of a conventional bistable multivibrator or flip-flop 48, and the output signal from the true output terminal T thereof applied to one input terminal 50 of a two input terminal AND gate 42 and to the input terminal of a suitable conventional astable multivibrator or oscillator 54. The clock output signal CLK of the oscillator 54 may be applied to the input terminal of a conventional divide-by-16 scaler 56 which, upon receipt of the sixteenth input pulse, provides an output signal RSET for application to the reset input terminal R of the flip-flop 48.

The output signal CLK of the oscillator 54 may be also applied to the other input terminal 58 of the AND gate 52, to one input terminal 60 of a two input terminal AND gate 62 and to one input terminal 64 of a two input terminal AND gate 66. The CLK signal may be also applied through a conventional delay circuit 68 to the trigger input terminal of a suitable conventional monostable or one-shot multivibrator 70 and the output signal SHFT taken from the true output terminal thereof and applied to the shift input terminal S of the shift register 40 to effect the shifting of the input data from the keyboard 16 therethrough.

The output signal from the shift register 40 may be applied directly to the other input terminal 72 of the AND gate 66 and through an inverter 74 to the other input terminal 76 of the AND gate 62. The output terminal of the AND gate 66 is connected to one input terminal 78 of a two input terminal OR gate 80 and the output terminal of the AND gate 62 is connected to one input terminal 82 of a two input terminal OR gate 84. The output terminal of the AND gate 52 is connected to the other input terminal 86 of the OR gate 84 and to the other input terminal 88 of the OR gate 80. The output terminals of the OR gates 80 and 84 may be connected to the computer 90 by way of the cable 14 illustrated in FIG. 1 to provide respectively the positive output signal $O_p$ and the negative output signal $O_n$.

In operation, the operation of the key 3 of the keyboard 16 of FIGS. 1 and 2 will generate a pulse on the 3 output terminal of the keyboard 16. This pulse will be passed through the OR gate 41 to trigger the multivibrator 42 which in turn provides the LOAD signal effecting the loading of a binary one into the shift register 40 at the numeral 3 location. As can be seen from FIG. 4, the positive pulse 92 generated by the operation of the 3 key will not generate the LOAD signal but will provide an INH signal coincident with the termination of the pulse 92. The INH pulse 94 is of sufficient duration to prevent the generation of a second LOAD pulse in response to a second pulse 96 resulting from contact bounce or double operation of the 3 key.

Figure 4:
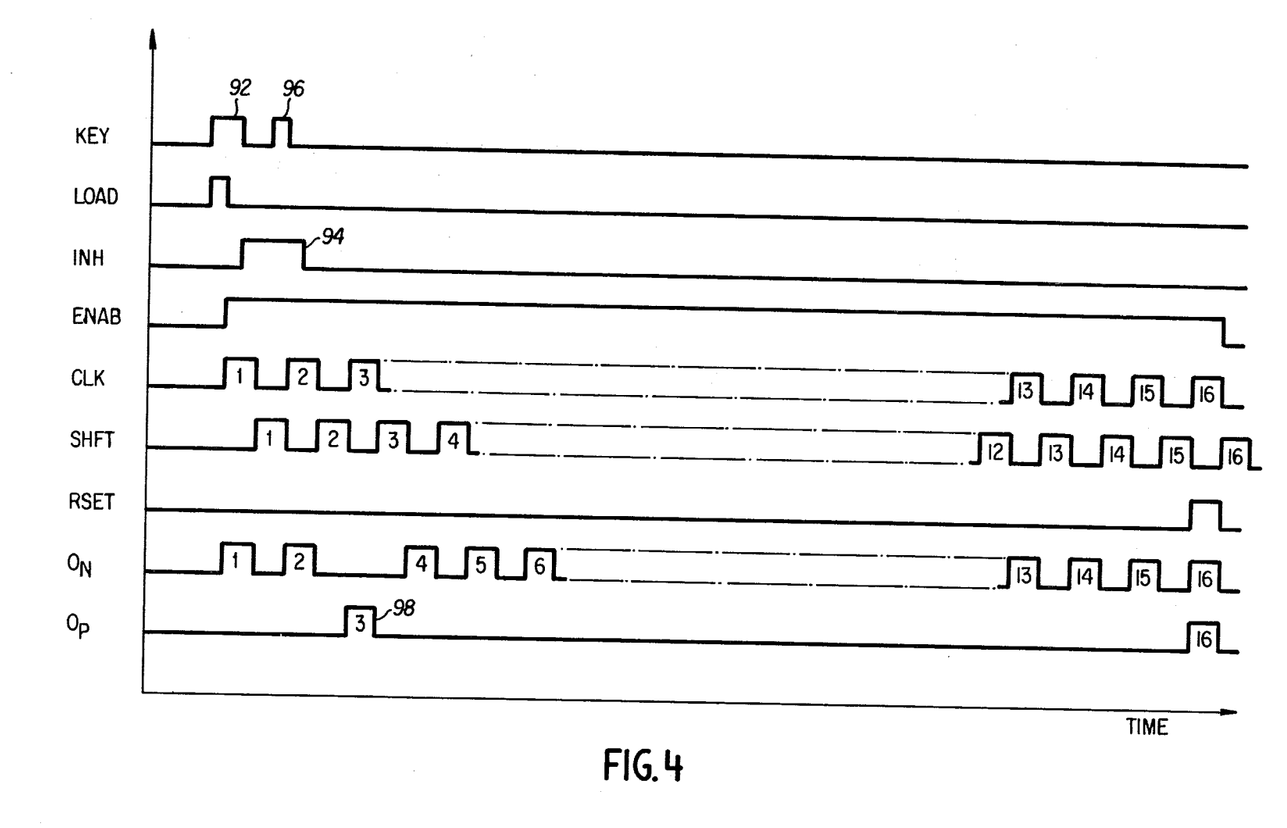
FIG. 4 is a timing diagram illustrating the waveforms at various places in the circuit of FIG. 3.

The LOAD signal also sets the flip-flop 48 to provide the ENAB signal which enables the oscillator 54. As shown in FIG. 4, the clock signal CLK is a series of constant frequency clock pulses available for the duration of the ENAB signal. When sixteen CLK pulses have been accumulated in the scaler 56, the RSET signal is generated to reset the flip-flop 48 and to remove the ENAB signal from the oscillator effecting the termination of its operation and thus the elimination of the CLK signal.

Each pulse in the CLK signal is delayed in the delay circuit 68 and used to trigger the multivibrator 70 to provide a SHFT signal. The sixteen SHFT pulses generated responsively to the sixteen CLK pulses for each key operation will shift the data in the shift register out in serial form. In the present example where the key 3 has been operated, the signal from the shift register 40 will include a single positive pulse in the third of twelve pulse positions.

The output signal from the shift register 40 is applied to the AND gate 66 and through the inverter 74 to the AND gate 62 where it is sampled by each of the pulses of the CLK signal. As a result, the sole positive pulse in the third of sixteen pulse positions appears as the pulse 98 in the output signal $O_p$ applied to the computer 90. Since the output signal from the shift register 40 is sampled in inverted form at the AND gate 62 for each pulse in the CLK signal, and since the output signal is at a high signal level for a binary zero, a series of positive pulses appears in the output signal $O_n$ at each pulse position other than the pulse position of the operated key of the keyboard 16.

The ENAB signal may be also sampled by the AND gate 52 for each pulse of the CLK signal so that pulses in the sixteenth pulse position of both the $O_p$ and $O_n$ signals occur for computer recognition purposes.

Communication between the console 12 of FIG. 1 and the computer 90 may be in any suitable conventional way such as a two-wire system utilizing self-clocking serial coded bit signals with each transmission to the computer comprising a single 16 bit word as has been explained in connection with FIGS. 3 and 4. The response of the computer may be a single 200 bit word received as separate signals $I_p$ in which a positive pulse represents a binary one and as an input signal $I_n$ in which the positive pulse represents a binary zero. This system is useful in that the appearance of a pulse at either one or the other of the two binary positions permits self-clocking.

Figure 5:
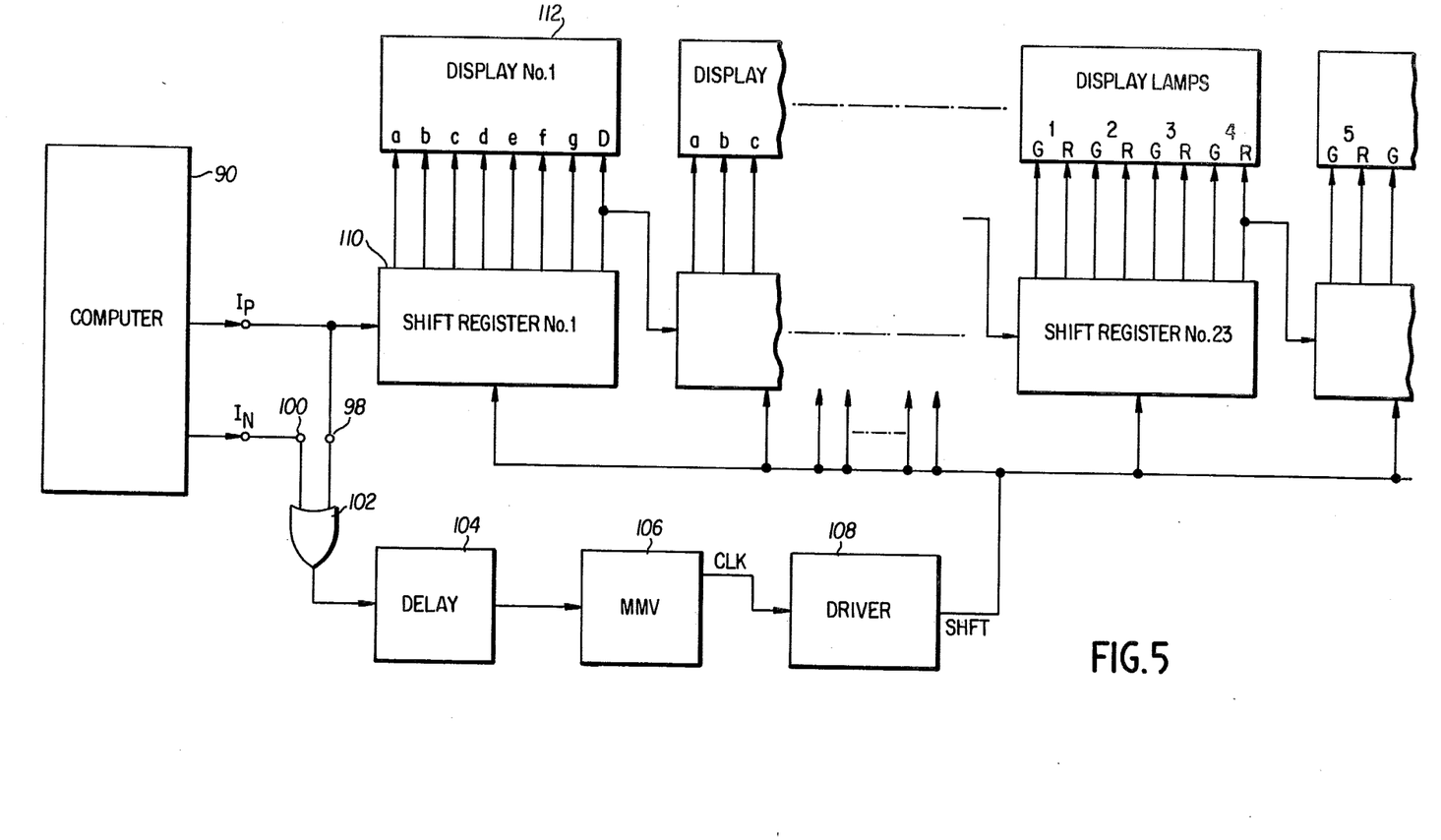
FIG. 5 is a functional block diagram of the circuit of the console of FIGS. 1 and 2 in the receive mode.

As illustrated in FIG. 5, the input signals $I_p$ and $I_n$ are applied respectively to the input terminals 98 and 100 of a two input OR gate 102 and the output terminal of the OR gate 102 is connected through a suitable conventional delay circuit 104 to the trigger input terminal of a suitable conventional monostable or one-shot multivibrator 106. The output signal CLK from the true output terminal of the multivibrator 106 may be used to trigger a driver circuit to generate a shift signal SHFT for application to the 25 eight bit shift registers which control the various displays of the console illustrated in FIG. 2. The positive pulses of the input signal $I_n$ are utilized only for clocking pulses and the signal $I_p$ is applied to the first shift register 110 of the 25 shift registers. The shift register 110 is a serial in-parallel out shift register which provides appropriate signals to control the various segments of a solid-state seven-segment numeric display 112.

Figure 6:
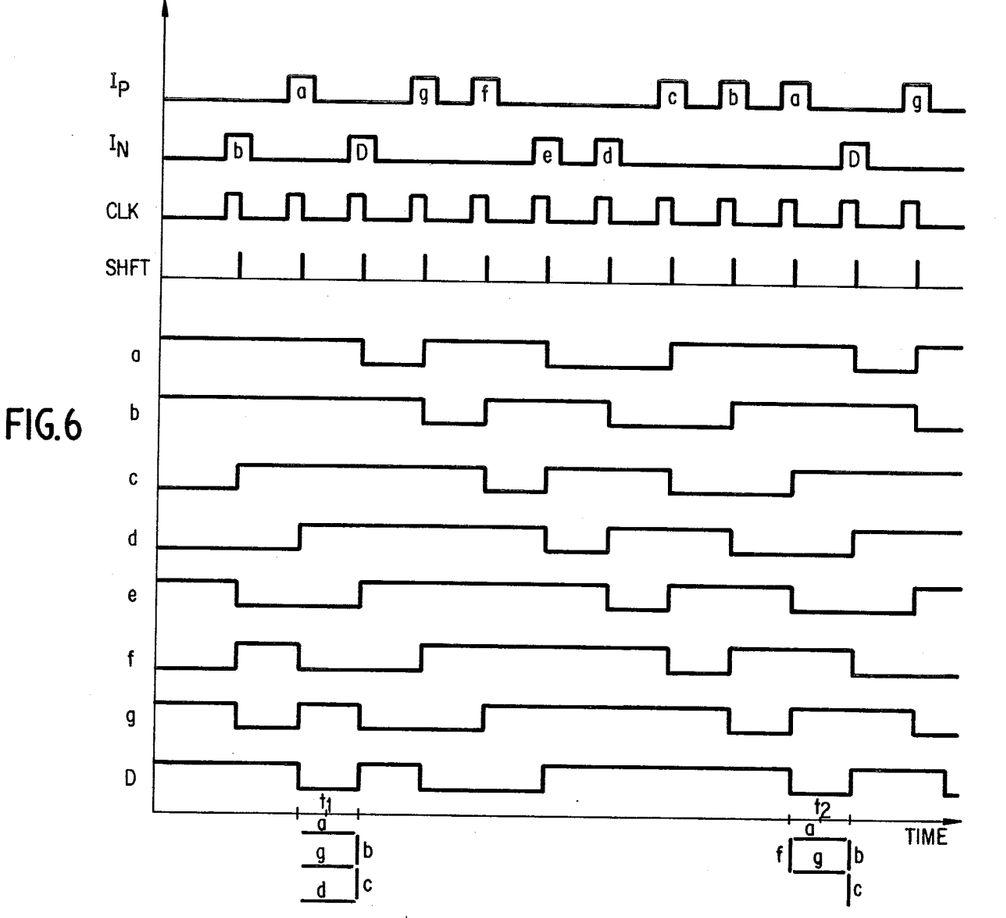
FIG. 6 is a timing diagram illustrating waveforms at various places in the circuit of FIG. 5; and, FIG. 7 is a schematic representation of a solid-state sevensegment numeric display for use in the console of FIGS. 1 and 2.
Figure 7:
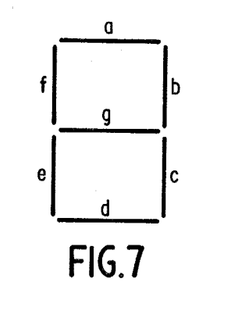

The first 22 of the 25 eight bit shift registers control the numeric display units of the code display 22, the item display 26, the score display 32, the rate display 34 and the main display 24 of the console 12 of FIGS. 1 and 2. As can be seen from the timing diagram of FIG. 6, the sampling of the contents of the shift register at time T1 will produce the numeric 3 indication and the sampling of the contents thereof at time T2 will be the numeric indication 9. Each of the display units may have seven segments as indicated in FIG. 7 with appropriate a-g designations and a high signal level at the waveform a of FIG. 6 at the time of sampling will provide illumination of the a segment of the display in a conventional manner.

The last three of the 25 eight bit shift registers may be utilized to control the ten green lamps 28 and the ten red lamps 30 associated with the main display 24 of the console illustrated in FIG. 2. In addition, the READY lamp 36 and ERROR light 38 are also controlled by these last shift registers.

ADVANTAGES AND SCOPE OF INVENTION

As can be seen from the foregoing description of the preferred embodiment of the present invention, the multiple answer format affords a wide range of choices and essentially eliminates guessing. The chance of selecting the five correct responses from the ten choices provided is mathematically 1/252 as compared to 1/5 for the usual multiple-choice question. By accumulating the sum of the errors made in ultimately arriving at the correct answer, a great refinement of the scoring may be accomplished. In addition, the learning process is continued by the indication of the correct items and the continual reference to the test question in order to correctly complete the response.

The cumulative adjustment of the score as the student progresses through the test is also a significant advantage as is the indication of the rate of performance for time based budgeting purposes. Both the performance scores and the rate of performance may be adjusted automatically to a norm for any selected group by appropriate modification of the computer program in a conventional manner.

It is, however, important to recognize that the preferred embodiment may be implemented in many ways through the use of other suitable conventional logic circuitry. It is also important to recognize that the form of the question may differ. For example, the plural answer questions may be ordered in that additional information in the order of the selection of the correct answers may also be of significance. In that event, the answers may be automatically weighted by the computer in the order selected by the student to provide still further resolution in the test score.

It is also important to recognize that the computer program may differ both in content and in language without departing from the present invention. The programming of a specific program in a specific language to accomplish varying testing functions is well within the state of the art.

The present invention may thus be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of administering a plural answer test comprising the steps of:
    (a) providing a question;
    (b) providing a first plurality of possible answers including a plurality of correct answers and a plurality of incorrect answers, the answers being automatically weighted consecutively in the order selected by the student;
    (c) selecting a first plurality of answers equal in number to the plurality of correct answers;
    (d) identifying the correct ones of the first plurality of answers selected by the student;
    (e) selecting answers equal in number to the number of incorrect ones of the first plurality of answers selected by the student;
    (f) identifying the correct ones of the most recently selected answers;
    (g) summing the weights of the correct answers as automatically weighted by the order in which selected; and,
    (h) subtracting from the sum the weights of the correct answers if selected in the correct sequence to thereby determine the departure of the student's response from a perfect score.

2. A method of administering a plural answer test comprising the steps of:
   (a) providing a question;
   (b) providing a first plurality of possible answers including a plurality of correct answers and a plurality of incorrect answers;
   (c) selecting a first plurality of answers equal in number to the plurality of correct answers;
   (d) identifying the correct ones of the first plurality of answers selected by the student;
   (e) selecting answers equal in number to the number of incorrect ones of the first plurality of answers selected by the student;
   (f) identifying the correct ones of the most recently selected answers;
   (g) continuing selecting succeeding additional answers equal in number to the number of said plurality of correct answers remaining unselected by the student after each pair of selecting and identifying steps as in steps (e) and (f) and then identifying the correct ones of the most recently selected answers as in step (f) until all of said plurality of correct answers to said question have been identified; and
   (h) determining the number of incorrect answers selected for use in determining the departure of the student's response from a perfect score.

3. A method of testing comprising the steps of:
   (a) providing a question having a plurality of answers;
   (b) providing a first plurality of possible answers including a plurality of correct answers and a plurality of incorrect answers;
   (c) selecting a first plurality of answers equal in number to the plurality of correct answers;
   (d) identifying the correct ones of the first plurality of answers selected by the student;
   (e) selecting additional answers equal in number to the number of incorrect ones of the first plurality of answers selected by the student;
   (f) identifying the correct ones of the most recently selected answers;
   (g) continuing selecting succeeding additional answers equal in number to the number of said plurality of correct answers remaining unselected by the student after each pair of selecting and identifying steps as in steps (e) and (f) and then identifying the correct ones of the most recently selected answers as in step (f) until all of said plurality of correct answers to said question have been identified; and
   (h) indicating the student's score.

4. The method of claim 3 wherein the test includes a plurality of plural answer questions; and,
   including the further step of indicating the rate of test progression after each question in the test has been answered.

5. The method of claim 4 including the step of updating the student's score after each question in the test has been answered.

6. The method of claim 3 wherein the identification of correct ones of the first plurality of answers selected by the student is automatically responsive to the selection of the answer corresponding to the number of correct answers in the sequence of selection.

7. A console for administering multiple answers, electronically scored tests comprising:
   (a) a housing;
   (b) a plurality of manually operable keys carried by said housing for selective operation by the testee;
   (c) a first plurality of manually readable, visual displays carried by said housing for identifying the operated ones of said plurality of keys, the number of said displays being equal to the number of correct answers to a given question and said displays being within the view of a testee while in position to manually operate said plurality of keys;
   (d) first display means carried by said housing for indicating the correctness of the key identification displayed at each of said first plurality of displays;
   (e) a second plurality of manually readable, visual displays carried by said housing for identifying the ones of said plurality of keys operated subsequent to the indication of the correctness of the key identification displayed at each of said first plurality of displays, said second plurality of displays being within the view of a testee while in position to manually operate said plurality of keys;
   (f) second display means carried by said housing for indicating the correctness of the key identification displayed at each of said second plurality of displays; and,
   (g) a third plurality of manually readable, visual displays carried by said housing for indicating the test score to the testee, said third plurality of displays being within the view of a testee while in position to manually operate said plurality of keys.

8. The console of claim 7 including a fourth plurality of manually readable, visual displays carried by said housing for indicating the rate at which the testee is progressing through the test, said fourth plurality of displays being within the view of a testee while in position to manually operate said plurality of keys.

9. The console of claim 8 wherein the rate of progression through the test indicated by said third plurality of visual displays is relative to a predetermined standard.

10. The console of claim 7 wherein said second plurality of displays is equal in number to the number of said first plurality of displays.

11. The console of claim 7 wherein said first display means is automatically responsive to the operation of a number of keys equal to the number of correct answers.

12. The console of claim 7 wherein said second plurality of displays is automatically updated upon the completion of each question on the test.

13. A method of administering a plural answer test comprising the steps of:
   (a) providing a question;
   (b) providing a first plurality of possible answers including a plurality of correct answers and a plurality of incorrect answers, the answers being automatically weighted consecutively in the order selected by the student;
   (c) selecting a first plurality of answers equal in number to the plurality of correct answers;
   (d) identifying the correct ones of the first plurality of answers selected by the student;
   (e) selecting answers equal in number to the number of incorrect ones of the first plurality of answers selected by the student;
   (f) identifying the correct ones of the most recently selected answers;
   (g) continuing selecting succeeding additional answers equal in number to the number of said plurality of correct answers remaining unselected by the student after each pair of selecting and identifying steps as in steps (e) and (f) and then identifying the correct ones of the most recently selected answers as in step (f) until all of said correct answers to said question have been identified;

(h) summing the weights of the correct answers as automatically weighted by the order in which selected; and (i) subtracting from the sum the weights of the correct answers if selected in the correct sequence to thereby determine the departure of the student's response from a perfect score.